United States Patent [19]
Vaage

[11] Patent Number: 5,646,380
[45] Date of Patent: Jul. 8, 1997

[54] DRIVE ASSEMBLY FOR ACOUSTIC SOURCES

[76] Inventor: Svein Vaage, Øvertrøa 26, 7080 Heimdal, Norway

[21] Appl. No.: 525,534

[22] PCT Filed: Mar. 11, 1994

[86] PCT No.: PCT/NO94/00057

§ 371 Date: Nov. 20, 1995

§ 102(e) Date: Nov. 20, 1995

[87] PCT Pub. No.: WO94/22036

PCT Pub. Date: Sep. 29, 1994

[30] Foreign Application Priority Data

Mar. 15, 1993 [NO] Norway ......................... 930916

[51] Int. Cl.$^6$ ............................................. G01V 1/00
[52] U.S. Cl. ................................. 181/110; 367/142
[58] Field of Search ............................... 367/142, 141; 181/110

[56] References Cited

U.S. PATENT DOCUMENTS

| | | | |
|---|---|---|---|
| 4,332,017 | 5/1982 | Massa | 367/148 |
| 4,514,834 | 4/1985 | Hanson et al. | 367/141 |
| 4,845,688 | 7/1989 | Butler | 367/174 |
| 4,941,202 | 7/1990 | Upton | 367/165 |
| 5,070,486 | 12/1991 | Boucher | 367/155 |
| 5,237,543 | 8/1993 | Erickson et al. | 367/163 |
| 5,276,657 | 1/1994 | Newnham et al. | 367/163 |
| 5,291,461 | 3/1994 | Boeglin et al. | 367/163 |
| 5,329,499 | 7/1994 | Molund et al. | 367/174 |

*Primary Examiner*—J. Woodrow Eldred

[57] ABSTRACT

Drive assembly for acoustic sources having sound emitting surfaces adapted to be excited into vibration movements, in particular for use in seismic explorations. The assembly comprises an electric rotational motor (17) with an associated axle which comprises an axle part (18) the outer cross-sectional contour of which at least partially in the axial extension of the axle part is non-circular, but preferably smoothly rounded. Further the assembly comprises a number of push rods (21, 22) being arranged radially in relation to the axle (18) and adapted to preferably indirectly at their radially inner ends (23, 24) to be influenced by the non-circular axle part (18) during rotation of the axle, whereas the radially outer ends of the push rods (21, 22) are adapted to excite said sound emitting surfaces (1) into vibrational movement.

19 Claims, 3 Drawing Sheets

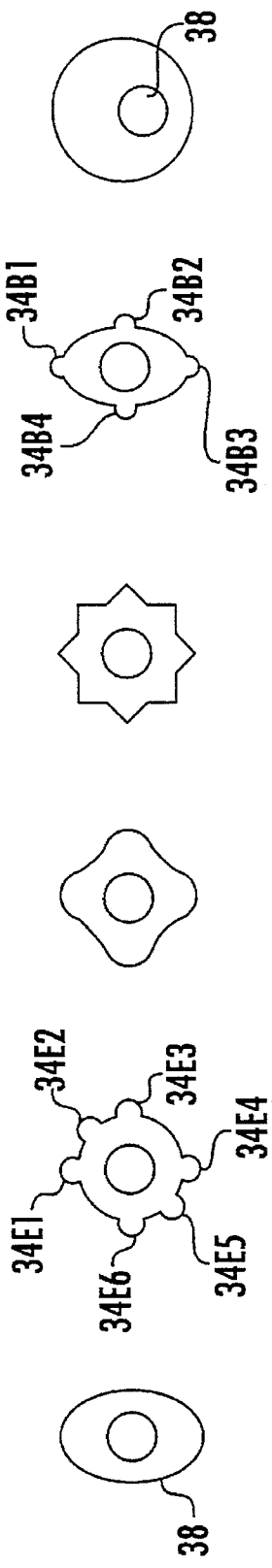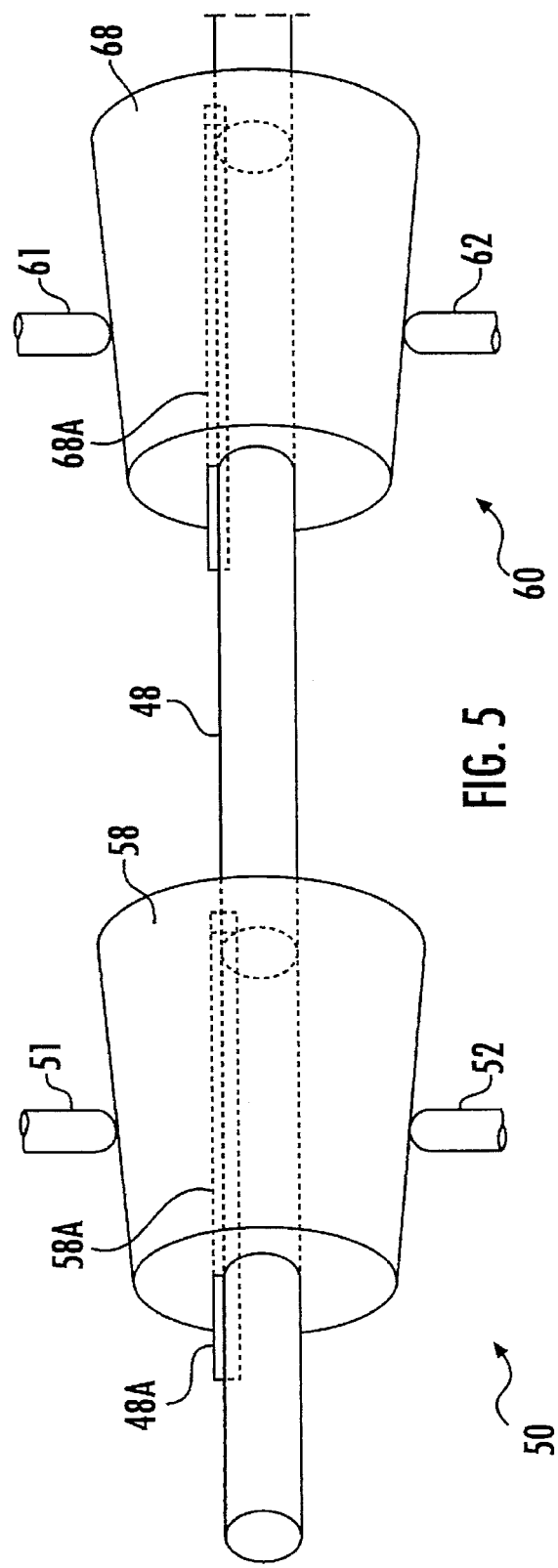

DRIVE ASSEMBLY FOR ACOUSTIC SOURCES

This invention relates to a drive assembly for acoustic sources having sound emitting surfaces adapted to be excited into vibrational movement, in particular for use in seismic prospecting.

Sources employed for generating sound waves in water can for example be sonar sources, flextensional sources or seismic transmitters or energy sources. Advantageously the invention can be employed for such types of sources, i.e. for emitting sound waves under water. Upon reflection from the sea bed and underlying geological formations resulting echo signals can be detected by means of hydrophones or geophones of various types.

It is well known that low frequency sound waves can be transmitted over longer distances through water and geological structures than high frequency sound waves can. Within military applications as well as within the marine sector of oil and gas industry there has for a long time been a need for powerful low frequency sound sources which can operate under water. Sources of various constructions and designs for these purposes and fields of use, have been available for a long time. Such acoustic sources are for example described in Seismic Energy Sources 1968 Handbook, Bendix, United Geophysical Corporation 1968, and in Transducer Needs for Low-Frequency Sonar, Proceedings of the Second International Workshop on Power Transducers for Sonic and Ultrasonics, France, June 12–13, 1990.

Most of the acoustic sources employed today are of the impulsive type, in which efforts are made to have the sources emit as much energy as possible during as short time as possible. The frequency contents of such a source can be modified only to a very small degree, and different sources are selected for different surveying problems.

In recent time there have been developed seismic energy sources in the form of vibrators which can vibrate within various frequency bands, so-called "frequency sweep". To this group there belong vibrators which operate by employing hydraulic means and sources employing piezoelectric or magnetostrictive materials. In hydraulic vibrators a piston is controlled by a valve arrangement, and thereby it is possible to obtain large oscillation amplitudes. The piezo-electrical effect as known involves a change of length of a crystalline material when an electrical voltage is applied to the outer surfaces thereof, and conversely that an electrical voltage is generated when the material is subjected to a physical deformation. Magnetostriction means that a magnetic material being subjected to a magnetic field change will undergo a length change, and conversely that an applied length change of the material will give rise to a change of the magnetic field.

There are various different manners of designing acoustic sources. For low frequency uses it is common to let the sources have a circular surface (in the form of a piston) when the hydraulic principle is employed, and a cylindrical shape with either a circular or elliptic cross-section when piezoelectric and magnetostrictive materials are used.

A concept where a hydraulic piston source is employed, is described in The Marine Vibrator Source, First Break Vol. 6 No. 9, September 1988/285.

The greatest problem with this type of controllable sources is to obtain a well defined and sufficiently high amplitude of the oscillations. In order to obtain this there will be a need for either a large source surface or a small source surface having high oscillation amplitudes.

Vibrators based on the hydraulic principle (for example within marine seismic exploration) provide high amplitudes at low frequencies. The piston movements are controlled by a valve arrangement. The degree of control of these hydraulic piston sources as regards amplitude combined with frequency, is limited, however.

The availability of so-called high-magnetostrictive magnetic materials has improved the possibilities of manufacturing good acoustic sources. By using this type of materials as drive elements it is possible to obtain amplitude changes which can be up to 20 times larger than the corresponding amplitudes in the case of a piezoelectric material. Sources employing high-magnetostrictive materials have been commercially available for several years. The amplitude improvement, however, is still relatively modest, and the magnetostrictive materials have serious restrictions at low frequencies, even though the control of the amplitude is simple and very exact.

A normal design of the actual driver shall be discussed closer here, taking as a starting point a cylindrical source having an elliptic cross-section: The cylindrical casing consists of an elastic membrane or shell. Inside and in parallel to the cylinder axis and in engagement against the shell, there are provided two end beams. The cross-section surface of the beams is a symmetrical mirror image in relation to the short axis of the elliptic shell, and each beam is delimited by that portion of the shell which faces the end of the long axis and a cord parallel to the short axis. Between the beams and in engagement with their parallel side faces there is provided an electrically controlled drive element in the form of a drive rod. The longitudinal axis of the drive rod coincides with the long axis of the elliptically shaped cross-section and is equally spaced from the end faces of the source. If the magnetostrictive principle is employed, the drive rod consists of a magnetic and preferably a high-magnetostrictive material, which is magnetized by the surrounding electric coil according to the desired frequency of the source. If the piezoelectric principle is used the drive rod is made of a piezoelectric material. Of course the drive rod can consist completely or partially of any material which provides for the desired possibility of length changes.

The fundamental design of an acoustic source as described above can vary in details. An acoustic source having a cylindrical shape and an elliptical cross-section having drive rods of high-magnetostrictive material is described inter alia in U.S. Pat. No. 4,901,293 "A rare earth flextensional transducer".

The invention relates to a basic concept for what is referred to above as a drive element, but which in the following description will be referred to as a drive assembly or drive pack. As to the remaining parts of a source a starting point is taken in a design having a cylindrical shape and an elliptical cross-section, as mentioned above. The source has an elastic membrane or shell and two inner end beams at the ends of the long axis.

The drive system in its broadest sense comprises according to an embodiment of the invention, a frame having an outer shape as a right-angled parallelepiped. A drive assembly consisting of an electric motor coupled to an axle having an oval and conical shape is attached to the frame. The oval and conical shaped axle is in engagement with an adjustable cradle. Against the cradle there are provided push rods which transfer the force to the membrane. The electric motor is connected to a motor regulator which controls the frequency. By rotation of the oval and conically shaped axle, the membrane is caused to oscillate back forth in proportion to the rotational velocity. Depending upon how the oval and conical axle is shaped, large low frequency amplitudes can be generated.

The amplitude is varied in this embodiment by displacing the adjustable cradle axially in relation to the oval and conical axle, by using a linear motor. In this method movement amplitude acting on the push rods being connected to the membrane through the end beams, can be varied. By varying the frequency with a motor regulator and the movement amplitude with the linear motor, it is possible to obtain selectable frequency sweeps having the desired amplitude and frequency.

In this embodiment the height of the frame is adapted so as to substantially correspond to the distance between the parallel inner sides of the end beams, i.e. the length of the long axis between the end beams. The width of the frame corresponds to the axial length of the cylindrical shell. The thickness of the frame can be varied without much restriction, and can for example be made of rectangular beams, T beams, L beams, I beams, tubes or other structural elements of suitable materials. As described below the elliptically shaped end plates of the source are attached to the height-thickness sides of the frame.

A desired mechanical bias is provided for by devices on the push rods. The push rods, which transfer the forces to the membrane, are provided with a screw device for example, which makes it possible to obtain longer or shorter rods, which means that the mechanical bias can be varied.

The concept described here for designing an acoustic source involves a large degree of freedom as regards structure, dimensions and acoustic power, since among other things a number of drive assemblies in a drive system can be freely selected. The frame involves good possibilities for mounting the assemblies or drive packs and for attaching the end beams during manufacture of the membrane.

In view of the background given above and as will appear from the following description, the drive pack or assembly according to the invention in its most general form is characterized by an electric rotational motor having an associated axle which comprises at least one axle part the outer cross-sectional contour of which at least partially in the axial extension of the axle part, is non-circular, but preferably smoothly rounded, for example in the form of an oval cross-sectional contour, and a number of push rods being arranged radially in relation to the axle and preferably indirectly at their radially inner ends, adapted to be influenced by the non-circular axle part during rotation of the axle, whereas the radially outer ends of the push rods are adapted to cause vibrational movement of said sound emitting surfaces.

The invention as well as additional specific features thereof will be explained more closely in the following description, with reference to the drawings.

FIGS. 4A–4F illustrate various cross-sectional shapes of the non-circular axle part, and FIG. 5 shows an alternative embodiment to what is illustrated in FIGS. 2 and 3.

Figure 1:
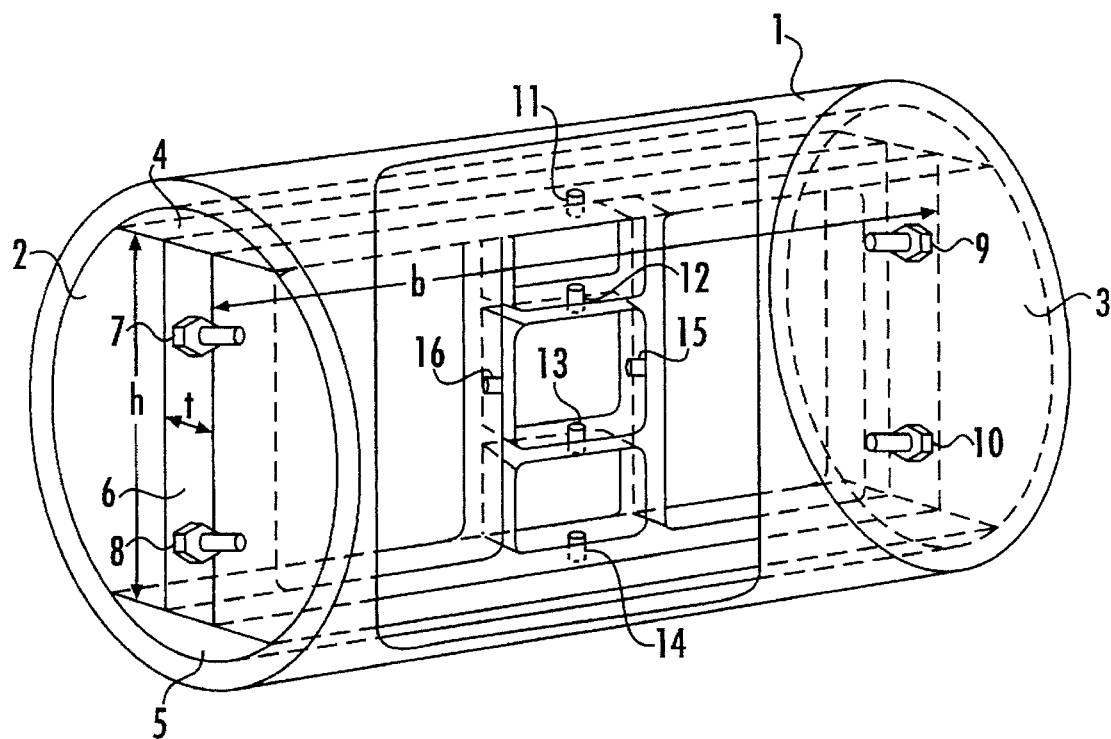
FIG. 1 shows a cylindrical acoustic source having an elliptical cross-section, including a drive pack according to the invention

An acoustic source in which the drive system according to the invention preferably can be employed, is shown in FIG. 1. As will be seen the source has a cylindrical shape with an elliptical cross-section. Externally the source consists 5 of a casing surface in the form of an elastic membrane 1 and end plates 2 and 3. Inside the membrane there are two end beams 4 and 5 at the ends of the long axis of the elliptical cross-section.

The drive pack is mounted within a rectangular frame 6. The frame is located centrally inside the membrane in such a way that a plane midway between and parallel to both the height-width sides coincides with the plane of all long axes. The height h of the frame is so adapted that it generally corresponds to the free space between the end beams, which in practice means that the frame will engage the end beams. The width b of the frame corresponds to the axial length of the cylindrical membrane. Therefore the end plates of the the source can be attached with screws 7, 8, 9 and 10 to the height-width sides of the frame. The thickness t of the frame, i.e. the spacing between the two height-width sides, is broadly determined by the requirements to a practical building-in of the drive pack as well as the requirements as to dimensions of through-openings for the push rods. Since the frame is "floating" within the source when this—by means of the push rods—is arranged in a mechanically biassed condition, the frame as such will not be subjected to any significant mechanical strain. Accordingly, the height and the width of the frame will mainly be determined by the number of push rods or drive packs being needed in order to obtain the desired acoustic power. Through-openings 11, 12, 13 and 14 for the push rods of the drive pack, are located in the frame along a common central axis or line. Through-openings 15, 16 for the motor axle and for the linear motor are provided in the frame normally to the openings for the push rods.

Figure 2:
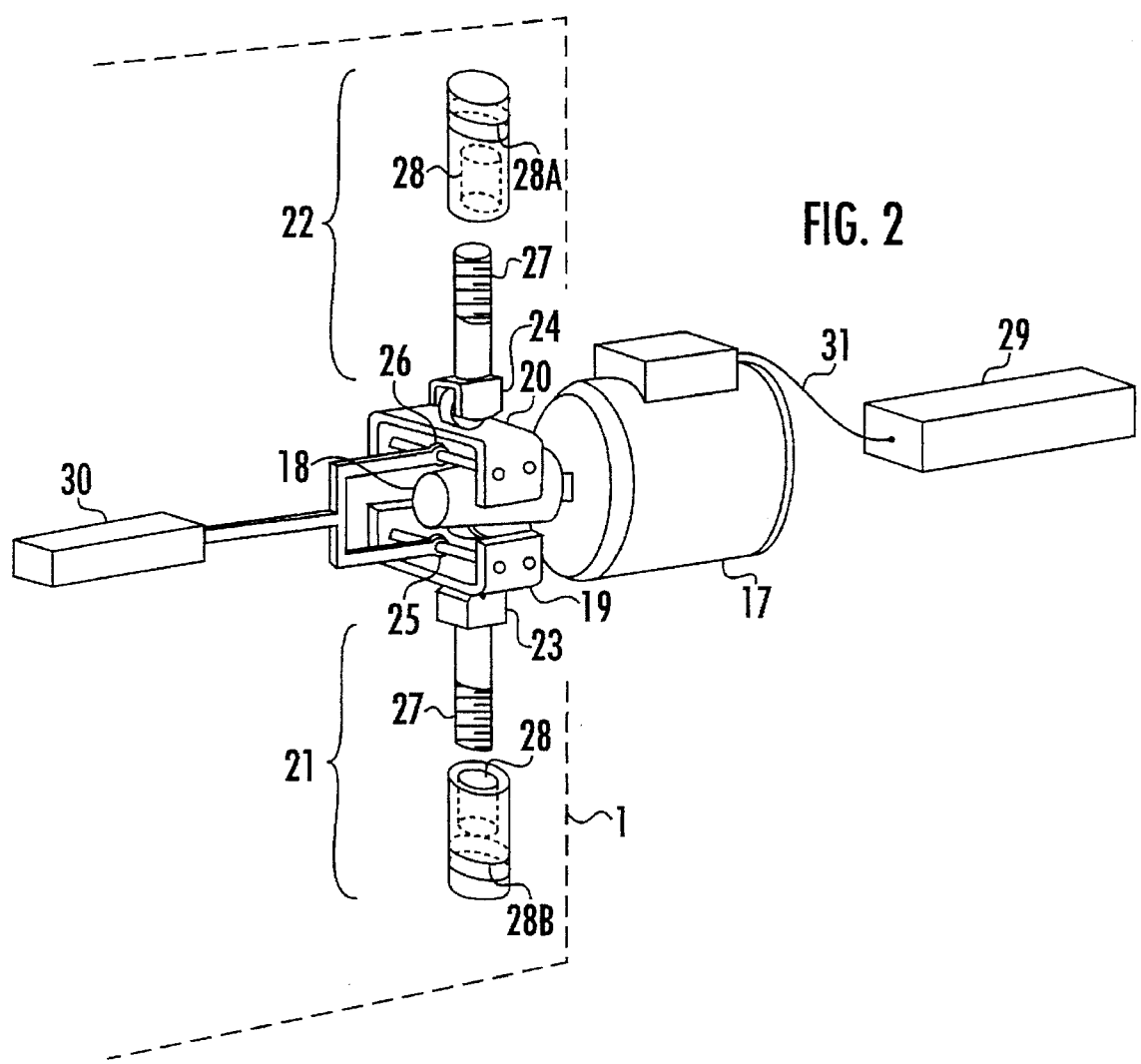
FIG. 2 shows details comprised by the drive pack.

An example of a drive assembly or pack according to the invention is shown in FIG. 2. An electric motor 17 is coupled to an oval and conically shaped axle 18. Against this axle there is engaged a displaceable cradle 19, 20 which acts against the pair of push rods 21, 22. At the end of the push rods there are shown glide wheels 23, 24 mounted for reducing the friction against the movable cradle 19, 20. In the movable cradle there are provided glide wheels 25, 25 for reducing the friction against the oval and conically shaped axle. Also other friction reducing means can be contemplated, where the actual bearing can be associated with the oval and conically shaped axle. By means of a threaded extension piece 27, 28 the push rods can be rotated and thereby the mechanical bias can be changed. The method of the mechanically biassing the push rods can take various forms, as for example by using wedges or hydraulic pistons.

The RPM of the electric motor 17 can be regulated by means of a control system 29 which is connected to the electric motor through an electric cable 31. This control system can comprise for example a frequency converter or the like, depending upon whether an AC motor or a DC motor is used. The amplitude is varied by means of an axle having an oval and conical shape 18 and by a movable cradle 19, 20 engaging the axle and being adapted to be axially displaced along the axle by means of a linear motor 30. Instead of a linear motor various other devices and means can be employed for causing a sufficient movement of the cradle. Another way of controlling the amplitude may be to have the position of the eccentric axle radially blocked by means of a key and can be displaced axially in relation to the axle of the motor by using for example a linear motor, as explained below with reference to FIG. 5.

Figure 3:
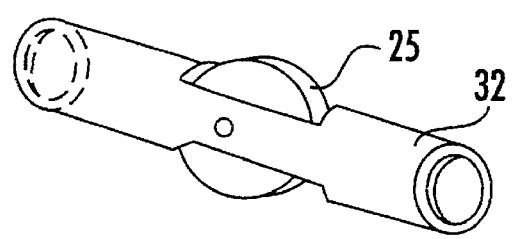
FIG. 3 shows glide wheels being mounted in the cradle.

In FIG. 3 an example is shown of how a glide wheel 25 is mounted on an axle 32 in the cradle in order to reduce the friction against the oval and conically shaped axle.

The basic concept described with respect to the source as far as details are concerned, can be designed in a number of different manners, these being comprised by the invention. In addition to the choice of the number of push rods, amplitude generating axles, drive packs and frame dimensions as already mentioned above, this can be the location of the motor 17 outside the actual source as represented by the membrane 1 and as indicated schematically in FIG. 2.

The amplitude generating axle previously described as the oval and conically shaped axle 18, can be designed in various manners whereby the decisive parameter will be the desired frequency content. For example a design of the amplitude generating axle may be contemplated, for providing a number of frequencies simultaneously without changing the motor frequency. A few such modifications of the cross-sectional contour of the axle are discussed below with reference to FIG. 4. Moreover, it is fully possible that the source is designed so as to be used for one specific RPM and/or that the amplitude generating axle is replaceable for different uses. In certain uses it may be of interest only to have a cylindrical and not a conical amplitude generating axle.

If it is desired to extend the high frequency range of the source, drive elements based upon magnetostrictive or piezoelectric materials can be integrated in the push rods, as shown at 28A and 28B in FIG. 2.

Evidently, the drive pack can also be employed in sources of cylindrical shape and having a cross-section other than elliptical, for example a circular cross-section. Piston sources obviously represent another use of the drive pack, where for example a piston and a membrane of circular shape can be used, or two diametrically opposed pistons with circular membrane shapes, being arranged against each other. The membrane of course can have a different geometry from the circular shape.

FIGS. 4A–4F illustrate various shapes of the axle or more closely defined the axle part, as indicated on the preceding page. In FIGS. 4A–4F the actual motor axle is designated 38, whereas the cross-section and the contour of the specifically shaped axle parts for obtaining various frequency contents, is shown completely black around the actual drive axle 38.

The cross-sectional shape in FIG. 4F corresponds to the oval contour which has been discussed above with reference to FIG. 2. FIG. 4A shows a possibly still simpler elementary shape based upon a circular contour, which, however, due to its eccentricity in relation to the axle 38, represents a form of non-circularity which results in a fundamental frequency equal to half the basic frequency of the embodiment in FIG. 4F, provided that the rotational velocity of the drive axle 38 is the same.

FIG. 4B shows a modification in relation to the oval cross-section in FIG. 4F, wherein four projecting contour elements 34B1, 34B2, 34B3 and 34B4 give the excitation through the push rods a content of overharmonic frequencies with respect to the basic or fundamental frequency.

FIG. 4C shows a more edged cross-sectional contour with eight triangular projections or waves, which in contrast to the other examples shown do not have any significant rounding of the outer cross-sectional contour.

On the other hand FIG. 4D shows a well rounded cross-sectional contour having four wave crests. Finally FIG. 4E shows an embodiment of the axle part having a circular basic form modified by two groups consisting each of three wave crests, namely 34E1, 34E2, 34E3 and 34E4, 34E5, 34E6 respectively.

The variants of cross-sectional contours illustrated in FIGS. 4A–F show some of the possibilities being available as regards excitation with a specifically desired frequency content.

As also mentioned on the preceding page the amplitude regulation can take place by means of an axially displaceable axle part on the drive or motor axle. This embodiment is in principle shown in FIG. 5, where the drive axle 48 of the motor carries an axle part 58 constituting a separate part being axially displaceable on the drive axle 48. In all axially mutual positions, however, the axle part 58 is rotationally locked to the drive axle 48 by means of a key 48A thereon and a corresponding keyway 58A internally in the axle part 58. Purely schematically in FIG. 5 there is shown how two push rods 51 and 52 with their inner ends directly engage the outer surface or contour of axle part 58, so as to be actuated thereby during rotation. Thus, in similarity to the embodiment in FIG. 2, also the drive axle 48 and push rods 51, 52 always assume the same mutual position in axial direction, whereas displacement of the axle part 58 on the drive axle 48 can serve for amplitude control, which is based on the precondition that the non-circular axle part or member 58 is conical.

Finally, FIG. 5 shows that on the axle 48 in addition to unit 50 there can be provided an additional unit 60 of the same construction, i.e. an axle part 68 (or several such parts) with an associated set of push rods 61, 62 for excitation of the same sound emitting surfaces (not shown) in the acoustic source. Two or more such units 50, 60 can also be arranged on separate axles for each unit, these axles being then preferably all parallel.

I claim:

1. Drive assembly for acoustic sources having vibrationally excitable sound emitting surfaces, said drive assembly comprising:

an electric rotational motor having an axle which comprises at least one axle part, wherein the circumference of at least one transverse cross-section of the axle part is non-circular, wherein the axle part has a conicity, and a push rod having an inner end and an outer end, wherein the push rod is arranged radially in relation to the axle, wherein the inner end of the push rod is communicable with the axle part, wherein the sound emitting surfaces are excitable into vibrational movement by the outer end of the push rod.

2. Drive assembly according to claim 1, further comprising an axially displaceable, cradle-like device for transferring the rotational movement of the axle part into translational movement of the push rod.

3. Drive assembly according to claim 2, wherein said cradle-like device comprises an electric linear motor for axial displacement of the cradle-like device.

4. Drive assembly according to claim 1, further comprising a control system for regulating the rotations per minute (RPM) of the rotational motor.

5. Drive assembly according to claim 1, wherein said push rod comprises a plurality of push rods, each having an inner end and an outer end, wherein each push rod is arranged radially in relation to the axle.

6. Drive assembly according to claim 2, wherein said cradle device (19, 20) comprises glide wheels for running on said axle part having axles substantially parallel to the axle of the rotational motor.

7. Drive assembly according to claim 1, wherein the non-circular axle part has a cross-sectional shape with one or more projecting contour elements adapted to excite said sound emitting surfaces through the push rod at a desired frequency.

8. Drive assembly according to claim 1, wherein the push rod comprises a biasing device for adjusting the length of the push rod.

9. Drive assembly according to claim 1, wherein the push rod comprises a drive element for a supplementary or superposed excitation of said sound emitting surfaces by means of the push rod.

10. Drive assembly according to claim 1, wherein said drive assembly is located substantially within and in general surrounded by the associated acoustic source, and wherein the rotational motor is located outside the acoustic source.

11. Drive assembly according to claim 1, further comprising a plurality of parallel axles wherein each axle of said plurality of parallel axles comprises one or more non-circular axle parts wherein each axle part has a cooperating set of push rods.

12. Drive assembly according to claim claim 1, wherein the axle part is displaceable along the longitudinal axis of the axle and rotationally locked to the axle, wherein the push rod is position so that the inner end has the ability to be influenced by the axle part during rotation of the axle.

13. Drive assembly according to claim 9, wherein said drive dement of said push rod comprises a magnetostrictive element.

14. Drive assembly according to claim 9, wherein said drive element of said push rod comprises a piezoelectrical element.

15. Drive assembly for acoustic sources having vibrationally excitable sound emitting surfaces, said drive assembly comprising:

an electric rotational motor having an axle which comprises at least one axle part, wherein the circumference of at least one transverse cross-section of the axle part is non-circular, and a push rod having an inner end and an outer end, wherein the push rod is arranged radially in relation to the axle, wherein the inner end of the push rod is communicable with the axle part, wherein the sound emitting surfaces are excitable into vibrational movement by the outer end of the push rod, wherein the push rod comprises a biasing device for adjusting the length of the push rod.

16. Drive assembly according to claim 15, wherein the push rod comprises a drive element for a supplementary or superposed excitation of said sound emitting surfaces by means of the push rod.

17. Drive assembly according to claim 16, wherein said drive element of said push rods comprises a magnetostrictive element.

18. Drive assembly according to claim 16, wherein said drive element of said push rods comprises a piezoelectrical element.

19. Drive assembly according to claim 15, wherein said push rod comprises a plurality of push rods, each having an inner end and an outer end, wherein each push rod is arranged radially in relation to the axle, wherein each push rod comprises a biasing device for adjusting the length of each push rod.

* * * * *